United States Patent
Gu

(10) Patent No.: US 11,046,380 B1
(45) Date of Patent: Jun. 29, 2021

(54) MULTIFUNCTIONAL BICYCLE STAND

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 16/941,548

(22) Filed: Jul. 29, 2020

(51) Int. Cl.
*B62H 3/12* (2006.01)
*B62H 3/08* (2006.01)
*A47F 5/04* (2006.01)

(52) U.S. Cl.
CPC ............... *B62H 3/12* (2013.01); *A47F 5/04* (2013.01); *B62H 3/08* (2013.01)

(58) Field of Classification Search
CPC ... B62H 3/12; B62H 3/08; B62H 1/06; B62H 3/06; B62H 3/02; B62H 2700/00; B60R 9/10; A47F 5/04; A47F 5/05; A47F 5/106; E04H 12/2269; E04H 12/2253
USPC ....... 211/21, 18, 17, 22, 196, 205, 166, 175, 211/197; 248/127, 146, 151, 158, 161, 248/157, 163.1, 164, 431, 125.8
See application file for complete search history.

(56) References Cited

U.S. PATENT DOCUMENTS

| | | | | |
|---|---|---|---|---|
| 547,412 A * | 10/1895 | Boerum | ................... | B62H 3/12 211/17 |
| 576,002 A * | 1/1897 | Terrell | ................... | B62H 3/10 211/22 |
| 614,086 A * | 11/1898 | Chapman | ................... | B62H 3/00 211/22 |
| 615,995 A * | 12/1898 | Leonard | ................... | B62H 3/00 211/22 |
| 1,560,892 A * | 11/1925 | Bodine | ................... | B62H 3/00 211/22 |
| 2,698,726 A * | 1/1955 | Howe | ................... | A47J 37/0772 248/528 |
| 2,803,349 A * | 8/1957 | Talbot | ................... | B62H 3/10 211/22 |
| 3,352,426 A * | 11/1967 | Carlson | ................... | A63B 69/16 211/22 |
| 3,785,500 A * | 1/1974 | Kennelly | ................... | B62H 3/04 211/5 |
| 4,756,429 A * | 7/1988 | Lehman | ................... | A47F 5/05 211/163 |
| 4,770,303 A * | 9/1988 | Boyd | ................... | A47G 7/042 211/118 |
| 5,083,729 A * | 1/1992 | Saeks | ................... | B62H 3/12 211/17 |
| 5,234,115 A * | 8/1993 | Lin | ................... | F24B 1/199 211/196 |
| 5,238,125 A * | 8/1993 | Smith | ................... | B62H 3/08 211/19 |

(Continued)

*Primary Examiner* — Jennifer E. Novosad

(57) ABSTRACT

A multifunctional bicycle stand can be used to park a bicycle by a hanging mode and a normal parking mode. In the hanging mode, a front wheel of the bicycle can be hung on a hanging assembly; in the normal parking mode, with configuration of the at least one positioning rod group, the front wheel or the rear wheel of the bicycle can be placed in the restraining channel, so that a user can change the parking mode of the bicycle according to site condition, environmental factor and owned strength. In an embodiment, a width of the restraining channel can be adjusted according to a wheel width of the wheel, to firmly park the bicycle in the normal parking mode.

9 Claims, 13 Drawing Sheets

(56) References Cited

U.S. PATENT DOCUMENTS

| | | | | |
|---|---|---|---|---|
| 5,320,227 | A | * | 6/1994 | Minoura .................. B62H 3/00 |
| | | | | 211/22 |
| D437,164 | S | * | 2/2001 | Fickett ........................... D6/552 |
| 6,182,836 | B1 | * | 2/2001 | Gutierrez .................. A47F 7/04 |
| | | | | 211/22 |
| 6,371,309 | B1 | * | 4/2002 | Smith ...................... B62H 3/12 |
| | | | | 211/17 |
| 6,471,076 | B1 | * | 10/2002 | Chen ........................ A47F 5/02 |
| | | | | 211/205 |
| 6,679,388 | B1 | * | 1/2004 | Chiu ........................ B62H 3/12 |
| | | | | 211/22 |
| 6,843,380 | B1 | * | 1/2005 | Fickett .................... B62H 3/12 |
| | | | | 211/17 |
| 6,983,853 | B1 | * | 1/2006 | Fickett ..................... A47F 5/04 |
| | | | | 211/18 |
| 8,162,157 | B2 | * | 4/2012 | Brown ............... A63B 71/0036 |
| | | | | 211/85.7 |
| 8,528,749 | B2 | * | 9/2013 | Kerman ............... A47B 57/562 |
| | | | | 211/22 |
| D846,450 | S | * | 4/2019 | Fickett ......................... D12/115 |
| 10,750,859 | B1 | * | 8/2020 | Fickett ................... A47B 55/02 |
| 2004/0251219 | A1 | * | 12/2004 | Zimmerman ........... B62H 3/08 |
| | | | | 211/17 |
| 2005/0056740 | A1 | * | 3/2005 | Chuang ................ B25H 1/0014 |
| | | | | 248/176.1 |
| 2012/0312763 | A1 | * | 12/2012 | Huntington ............... A47F 7/04 |
| | | | | 211/22 |
| 2013/0327802 | A1 | * | 12/2013 | Hammond .............. B62H 3/12 |
| | | | | 224/519 |
| 2019/0002046 | A1 | * | 1/2019 | Tsai ........................ B62H 3/12 |
| 2019/0070472 | A1 | * | 3/2019 | Duran ....................... A47F 5/04 |
| 2019/0300081 | A1 | * | 10/2019 | Szordykowski .......... B25B 1/22 |

\* cited by examiner

MULTIFUNCTIONAL BICYCLE STAND

BACKGROUND OF THE INVENTION

1. Field of the Invention

The present invention is related to a technical field applied to bicycle, and more particularly to a multifunctional bicycle stand which allows a user to park or exhibit a bicycle firmly without shaking easily and allows a user to change a parking and an exhibiting mode of the bicycle according to different places; therefore, the multifunctional bicycle stand of the present invention can have excellent practicability.

2. Description of the Related Art

In recent years, the popularity of bicycles has led many people to open bicycle stores for sale. In a bicycle store, many bicycle parking stands are installed for exhibiting bicycle for customers to watch. For example, Taiwan utility model patent No. M359458, titled "Bicycle stand (3)" discloses a conventional parking stand commercially available on the market; the above-mentioned parking stand structure generally includes a main pipe and a supporting base at the bottom end of the main pipe, and a bent hanger rod is provided at the top of the main pipe; in order to exhibit the bicycle for consumers to view, a user can hang a front wheel of the bicycle on the hanger rod to make the bicycle stay in a standing position with the front wheel thereof facing up and the rear wheel thereof facing down. However, above-mentioned hanging manner has some problems. One of the problems is that it is easy to cause bicycles to shake; since the bicycle is hung on the hanger rod only, the bicycle may be shaken or swung easily to hit other object to cause damage when being touched by external force. Furthermore, some bicycle exhibition rooms may not have sufficient heights to exhibit bicycles in a standing mode, but the conventional parking stand cannot enable the user to park the bicycle in a non-standing mode; therefore, for an exhibition room with a small exhibition space, the conventional parking stand is not practical in use. The second problem is that if the user is a woman and a child with weak strength or insufficient height, the user cannot lift and hang the bicycle on the hanging rod. For above-mentioned problems, the conventional parking stand is not practical.

SUMMARY OF THE INVENTION

The main technology of the present invention is to enable a user to firmly hang a bicycle in a standing mode for exhibition and adjust a parking mode of the bicycle between the standing mode and a non-standing mode according to height limitation of different place, and also allow a user of different age group to park the bicycle firmly, thereby solving the problems and deficiencies described in the prior art. Therefore, in order to achieve the above-mentioned objective and effect, the multifunctional bicycle stand of the present invention has two embodiments. The first embodiment includes a main pipe, a hanging assembly, a support stand and at least one positioning rod group. The hanging assembly is mounted on a top of the main pipe and configured to hang a front wheel of a bicycle, and includes a hanger rod, a lateral rod, a connecting holder and a locking member, the connecting holder has an end abutted with an outer periphery of a top of the main pipe, and other end extended to form a horizontal rod, the locking member is inserted through the main pipe and tightly locked in the connecting holder, and an end of the hanger rod and an end of the lateral rod are connected to the horizontal rod, and the hanger rod and the lateral rod are arranged in parallel with each other and in interval. The support stand is disposed on a bottom end of the main pipe and configured to support the main pipe, and includes a plurality of support rods, and the adjacent two of the plurality of support rods form an included angle area therebetween. The at least one positioning rod group has two ends fixed on any adjacent two of the plurality of support rods, respectively and across the included angle area, and the at least one positioning rod group forms a restraining channel.

The second embodiment includes a main pipe, a hanging assembly, a support stand, at least one fixed rod, and at least one movable and extendable rod. The hanging assembly is mounted on a top of the main pipe and configured to hang a front wheel of a bicycle, and includes a hanger rod, a lateral rod, a connecting holder, and a locking member, the connecting holder has an end abutted with an outer periphery of the top of the main pipe, and other end extended to form a horizontal rod, and the locking member is inserted through the main pipe and tightly locked in the connecting holder, and an end of the hanger rod and an end of the lateral rod are connected to the horizontal rod, the hanger rod and the lateral rod are arranged in parallel with each other and in interval. The support stand is disposed on a bottom end of the main pipe and configured to support the main pipe, and includes a plurality of support rods, and the adjacent two of the plurality of support rods form an included angle area therebetween. The at least one fixed rod has two ends fixed on any two adjacent support rods respectively, and across the included angle area. The at least one movable and extendable rod is slidably disposed on the any adjacent two support rods, where the at least one fixed rod is disposed, of the plurality of support rods, and the at least one movable and extendable rod is disposed between the at least one fixed rod and the main pipe, and the at least one movable and extendable rod is slidable to close to or away from the main pipe, and a restraining channel is formed between the at least one movable and extendable rod and the at least one fixed rod and in communication with the included angle area corresponding thereto.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
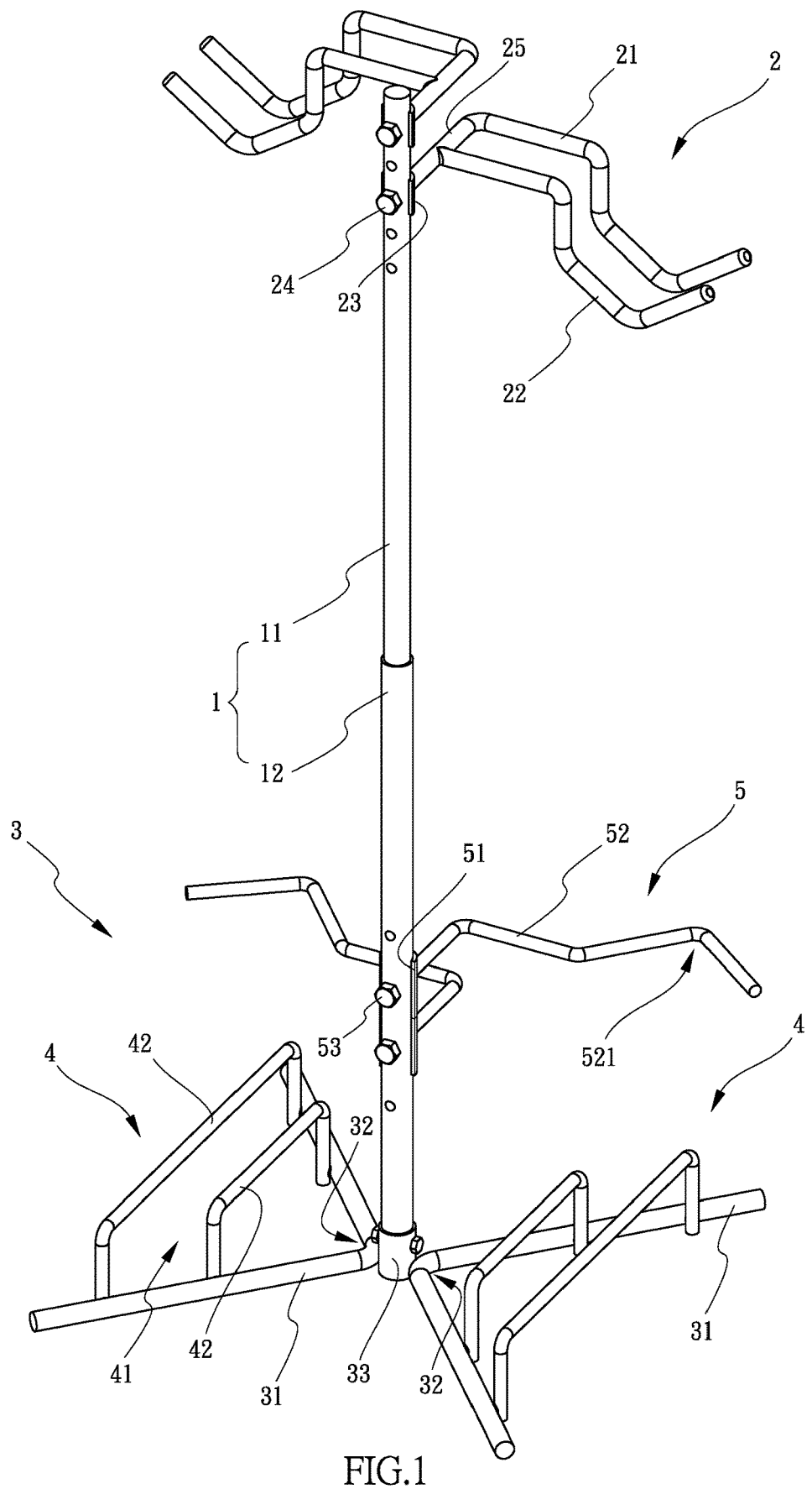
FIG. 1 is a perspective view of a first embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Please refer to FIGS. 1 to 5. The multifunctional bicycle stand of the present invention is mainly used to hang or park a bicycle 10 for exhibition, and has two main structures. The first main structure of the multifunctional bicycle stand includes a main pipe 1, a hanging assembly 2, a support stand 3 and at least one positioning rod group 4. The main pipe 1 is in a round tube shape, and the hanging assembly 2 is mounted on a top of the main pipe 1 and configured to hang a front wheel 101 of a bicycle 10. The hanging assembly 2 includes a hanger rod 21 continuously bent in multiple directions, a lateral rod 22 in the same shape as the hanger rod 21, a connecting holder 23 in an arc plate shape, and a locking member 24. The connecting holder 23 has an arc-concave end abutted with an outer periphery of a top of the main pipe 1, and other end extended, perpendicularly to the main pipe 1, to form a horizontal rod 25. The locking member 24 is inserted through the main pipe 1 and tightly locked in the connecting holder 23; in this embodiment, the main pipe 1 has multiple holes formed thereon, and the locking member 24 can be inserted into and locked with the multiple holes. An end of the hanger rod 21 and an end of the lateral rod 22 are connected to the horizontal rod 25, and the hanger rod 21 and the lateral rod 22 are arranged in parallel with each other and in interval. In use, the hanger rod 21 and the lateral rod 22 both can be inserted through a front wheel 101 of the bicycle 10 to firmly mount the bicycle 10. In this embodiment, the multifunctional bicycle stand is implemented with two hanging assemblies 2 for hanging two bicycles 10 on the main pipe 1 for exhibition and mounting. The support stand 3 is disposed on a bottom end of the main pipe 1 and configured to support the main pipe 1, and the support stand 3 includes a plurality of support rods 31 (as shown in figures, the support stand 3 includes four support rods 31), and two adjacent support rods 31 can form an included angle area 32 therebetween. The at least one positioning rod group 4 has two ends fixed on any two adjacent support rods 31, respectively, and across the corresponding included angle area 32, so that the at least one positioning rod group 4 can form a restraining channel 41. When the bicycle 10 is parked on the multifunctional bicycle stand 10, the bicycle can be hung on the hanging assembly 2 to form a standing mode; alternatively, a front wheel 101 or a rear wheel 102 of the bicycle 10 can be directly accommodated in the restraining channel 41 to firmly park the bicycle 10 in a non-standing mode.

Generally, sizes and heights of exhibition halls or stores for the bicycles 10 are not the same; in order to maintain consumers' viewing experiences in purchasing the bicycle 10, with configuration of the multifunctional bicycle stand of the present invention, the bicycle 10 can be hung in the standing mode when the height of the exhibition hall or store is sufficient, and the user only needs to hang the front wheel 101 of the bicycle 10 on the hanging assembly 2 and insert the hanger rod 21 and the lateral rod 22 through a rim of the front wheel 101, so as to complete the hanging placement of the bicycle 10; in the other hand, when the height of the exhibition hall or store is not enough for the bicycle 10 to be hung, the user only needs to park the bicycle 10 in the non-standing mode in which the front wheel 101 or the rear wheel 102 is directly accommodated in the restraining channel 41, so as to complete non-hanging placement of the bicycle 10. Therefore, the multifunctional bicycle stand of the present invention can be applied to the places with different heights, and enable women and children with less strength to directly mount the bicycle in the restraining channel 41 of the at least one positioning rod group 4 to prevent difficulty in hanging the bicycle 10 due to insufficient strength. Furthermore, multiple bicycles 10 can be hung or placed horizontally together on the multifunctional bicycle stand of the present invention.

Figure 2:
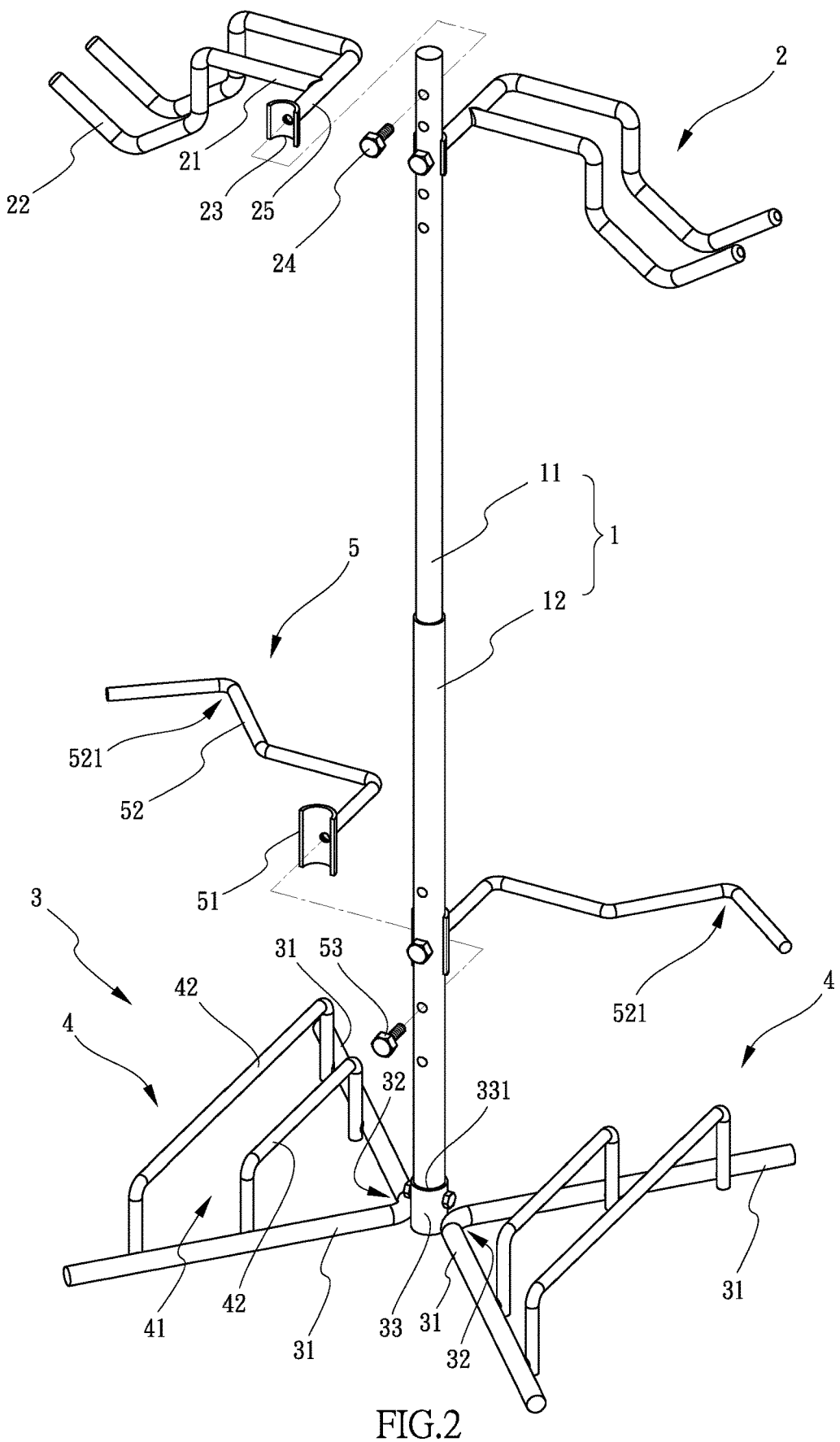
FIG. 2 is a perspective exploded view of the first embodiment of the present invention.
Figure 5:
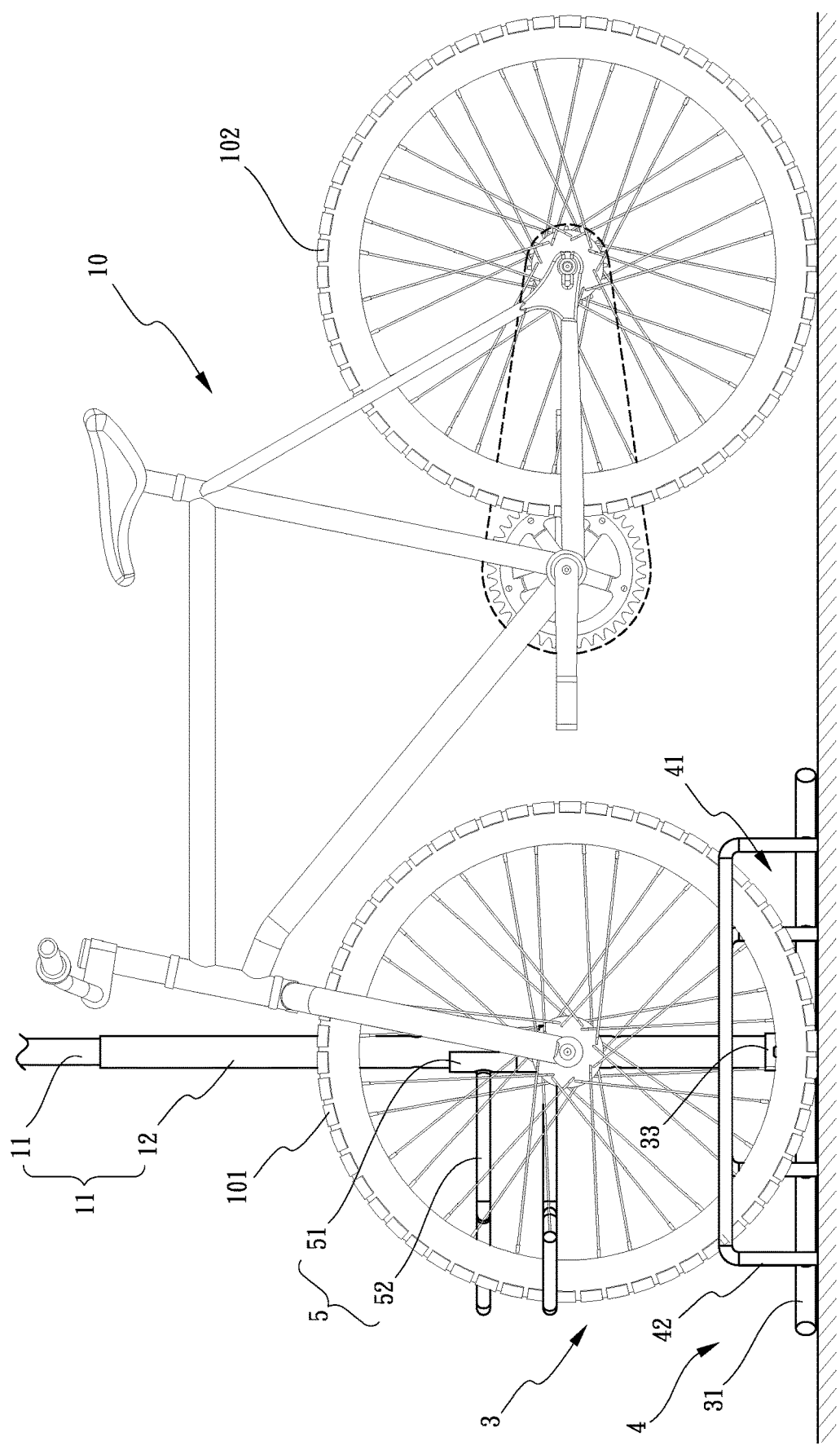
FIG. 5 is a schematic side view of FIG. 4.
Figure 6:
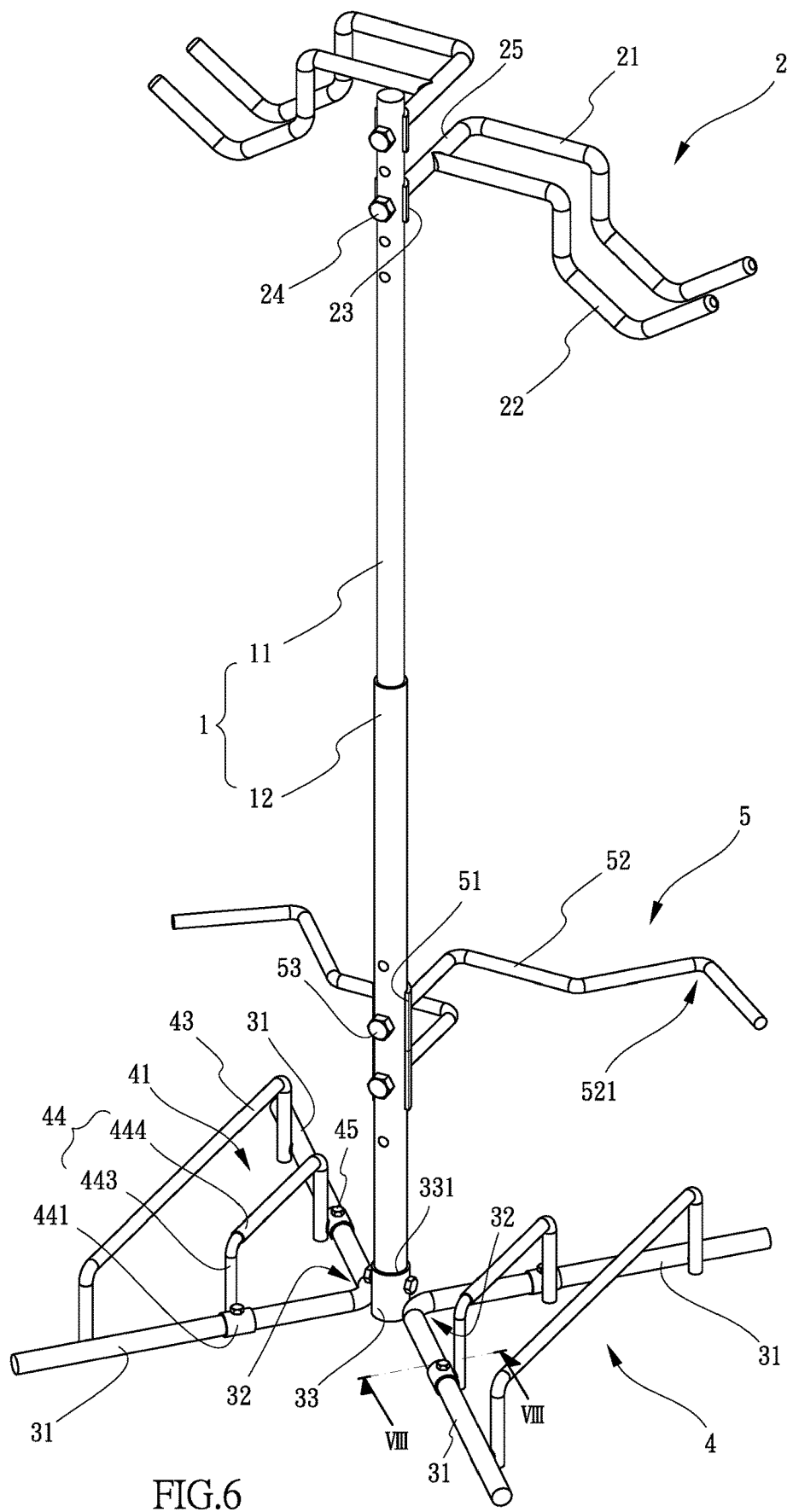
FIG. 6 is a perspective view of a second embodiment of the present invention.

More details of the first main structure of the present invention will be described in following paragraphs. The at least one positioning rod group 4 includes two arched pipes 42, and each arched pipe 42 is in an inverted-U shape, and the two ends of each arched pipe 42 are fixed on any two adjacent support rods 31, and the two arched pipes 42 are arranged in interval, and the interval formed between the two arched pipes 42 is defined as the restraining channel 41 mentioned above. A user can place the front wheel 101 or the rear wheel 102 of the bicycle 10 directly into the restraining channel 41 to complete the horizontal mounting of the bicycle 10, as shown in FIG. 5. Furthermore, in order to make the main pipe 1 to stably support the hanging placement of the bicycle 10, the support stand 3 can include a mounting pipe 33, an end of each of the support rods 31 is connected to an outer side surface of the mounting pipe 33, every two adjacent support rods 31 can form an included angle area 32 therebetween. The mounting pipe 33 has an insertion slot 331 recessed on a top surface thereof and toward the bottom surface thereof, and the main pipe 1 is inserted into the insertion slot 331. The configuration of the mounting pipe 33 and the support rod 31 can be used to support the main pipe 1 to stand, as shown in FIG. 2.

Figure 3:
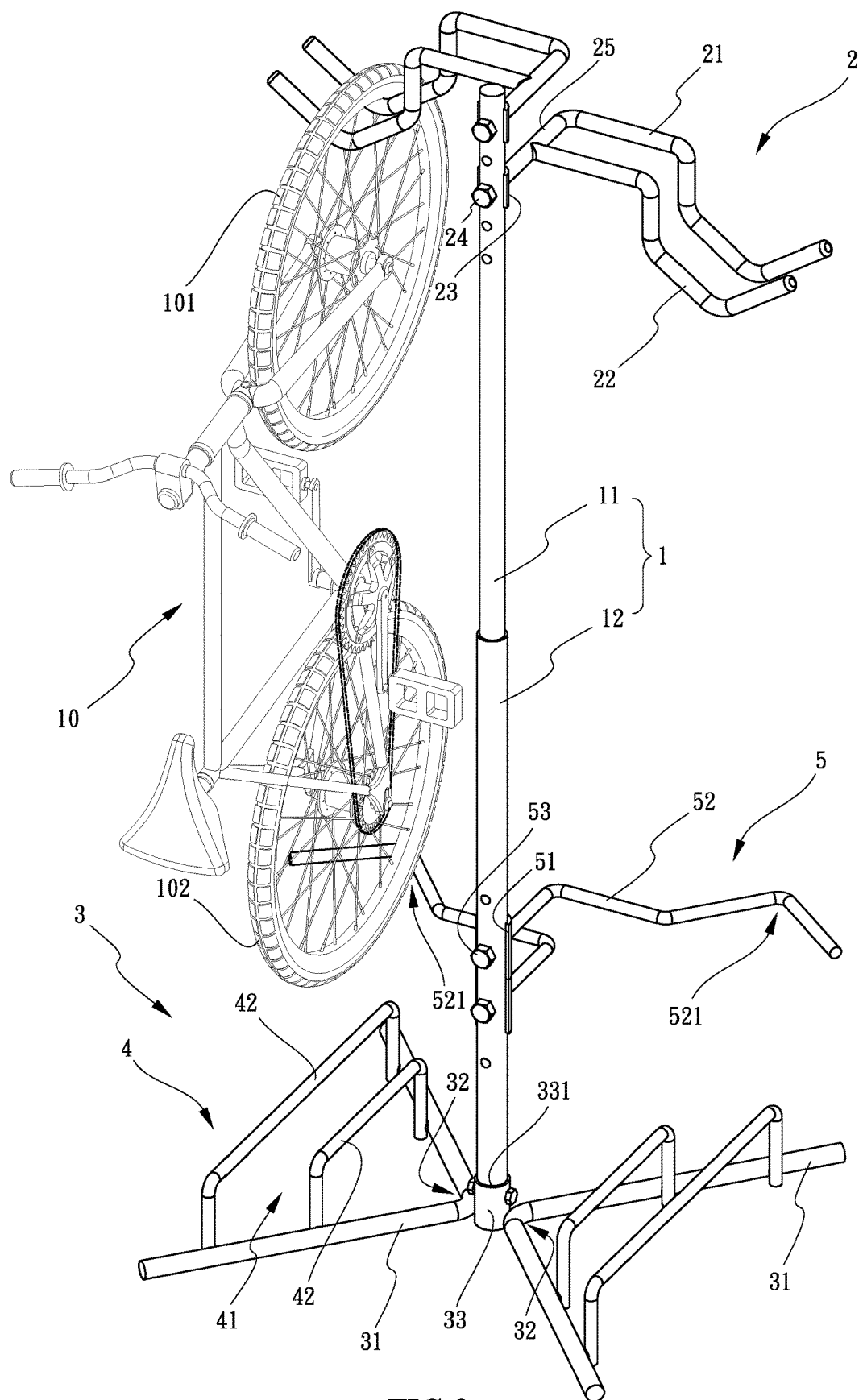
FIG. 3 is a schematic view of a usage status of a bicycle hung in the first embodiment of the present invention.
Figure 4:
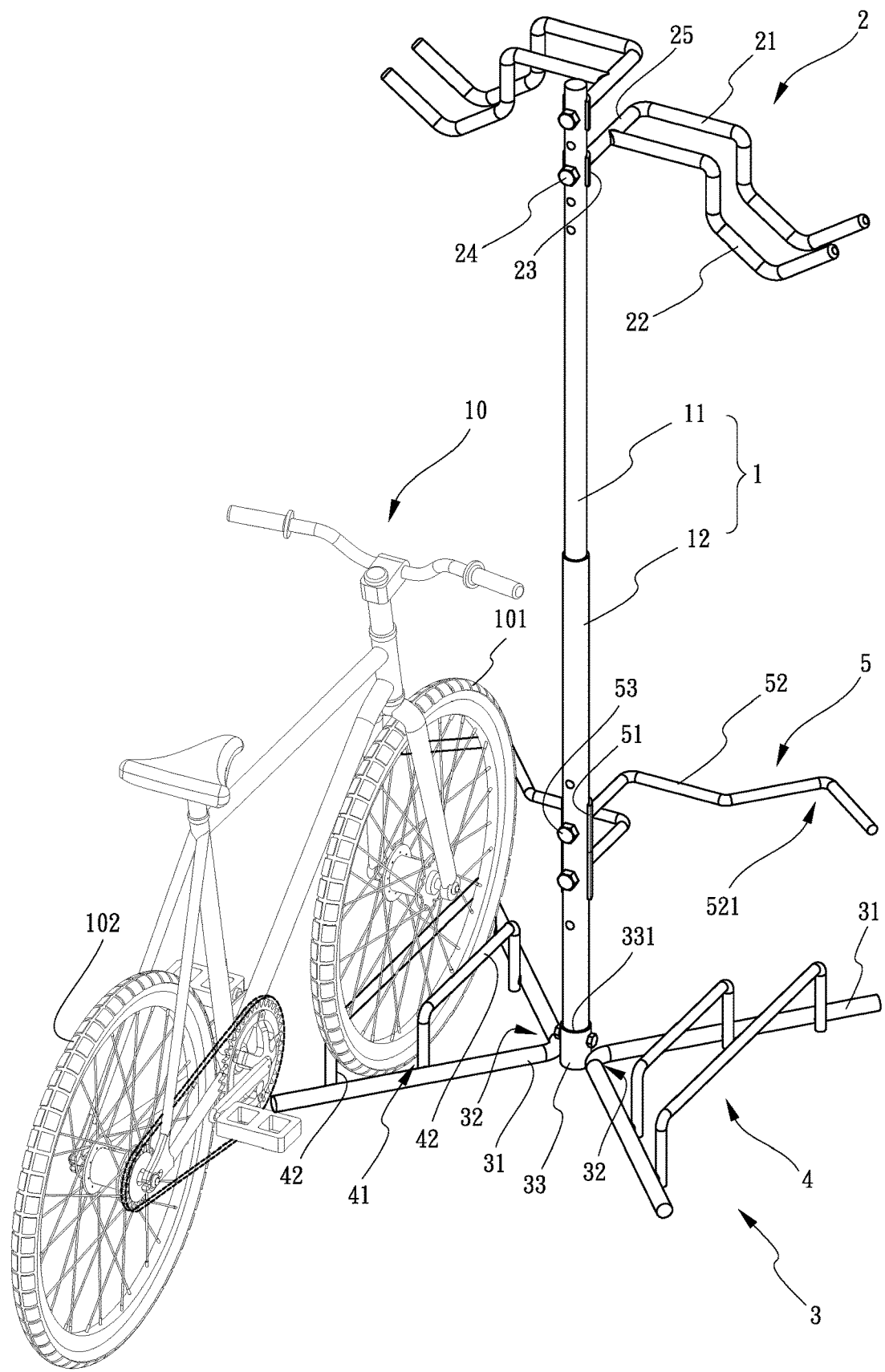
FIG. 4 is a perspective view of a bicycle of which a front wheel is parked in a restraining channel of the first embodiment of the present invention.

It is also worth mentioning that in order to improve the stability of the bicycle 10 hung on the multifunctional bicycle stand of the present invention to reduce large side-to-side swing, the multifunctional bicycle stand of the present invention can further include at least one bent pipe 5 mounted on the main pipe 1 disposed between the hanging assembly 2 and the support stand 3. The at least one bent pipe 5 can include a curved plate 51 and a bow-shaped pipe 52, the curved plate 51 has the same structure as that of the connecting holder 23, and the bow-shaped pipe 52 is M-shaped and has an end connected to a side of the curved plate 51. A curved recessed part of the curved plate 51 is abutted with the main pipe 1, and the bow-shaped pipe 52 is continuously bent to form at least one curved part 521. When a user parks the bicycle 10 in a hanging mode, the front wheel 101 of the bicycle 10 is hung on the hanger rod 21 and the lateral rod 22 of the hanging assembly 2, the rear wheel 102 is accommodated in the at least one curved part 521 and abutted with the bow-shaped pipe 52, and a screw 53 can be inserted through the main pipe 1 and locked with the curved plate 51. Therefore, the hung bicycle 10 can be prevented from being affected by an external force, so as to reduce swing magnitude of the hung bicycle 10, as shown in FIG. 3.

The difference between the first and second main structures of the present invention is the configuration of the at least one positioning rod group 4. The at least one positioning rod group 4 of the first structure is formed by arranging the two arched pipes 42 in interval; in the second structure of the present invention, the at least one positioning rod group 4 is separated into at least one fixed rod 43 and at least one movable and extendable rod 44, and two ends of the at least one fixed rod 43 is fixed on any two adjacent support rods 31, similar to the two arched pipes 42. The at least one movable and extendable rod 44 is slidably disposed on any two adjacent support rods 31 which are fixed with the at least one corresponding fixed rod 43, and the at least one movable and extendable rod 44 is disposed between the at least one fixed rod 43 and the main pipe 1, so that the at least one movable and extendable rod 44 is slidable to move close to or away from the main pipe 1, and a restraining channel 41 can be formed between the at least one fixed rod 43 and the at least one movable and extendable rod 44 and in communication with the included angle area 32 corresponding thereto. Therefore, the at least one movable and extendable rod 44 can be slid to change a width of the restraining channel 41, to adaptively place different wheel with different wheel diameter, as shown in FIGS. 6 to 11.

The second structure of the present invention can be implemented by two embodiments. Please refer to FIGS. 7 to 9, which show the first embodiment of the second structure. In the first embodiment of the second structure, at least one movable and extendable rod 44 includes a plurality of slidable mounting plates 441 disposed on two ends thereof, respectively, and each of the plurality of slidable mounting plates 441 is in an arc shape and abutted with the support rod 31 corresponding thereto, and the area of each slidable mounting plate 441 attached to the support rod 31 should exceed more than half of the outer surface of the support rod 31. A plurality of bolts 45 corresponding in number to the plurality of slidable mounting plates 441 are inserted into and locked with the plurality of slidable mounting plates 441, respectively, so as to tightly lock and abut against the outer surfaces of the support rods 31. When each bolt 45 is locked and abutted with the outer surface of the support rod 31, the slidable mounting plate 441 is slightly deformed to engage with the support rod 31; the bolts 45 can be firmly locked to fasten the at least one movable and extendable rod 44 after the at least one movable and extendable rod 44 is moved; in the other hand, after the bolts 45 are loosened relative to the slidable mounting plates 441 to release the slidable mounting plates 441 from abutting against the outer surface of the support rods 31, the at least one movable and extendable rod 44 is slidable to move close to or away from the main pipe 1. Please refer to FIGS. 10 to 13, which show the second embodiment of the second structure. Besides the manner of sliding the at least one movable and extendable rod 44, the support rods 31 of the second embodiment can have sliding slots 311 formed and recessed on the corresponding opposite inner sides thereof, respectively, and each sliding slot 311 can be in a dovetail shape, and the at least one movable and extendable rod 44 can have two locking holes 442 cut through two ends thereof and corresponding in position to openings of the sliding slots 311 of the support rods 31, respectively. Fastening blocks 46 are slidably disposed in the sliding slots 311 and engaged with the openings of the sliding slots 311, respectively, and each fastening block 46 has a screw hole 461 formed correspondingly in position to the corresponding one of the locking holes 442, and screw members 6 can be inserted through the locking hole 442 and locked with the screw holes 461 of the fastening blocks 46, respectively; after the screw member 6 are tightly screwed with the fastening blocks 46, the fastening blocks 46 and the screw members 6 are tightly locked with the two ends of the at least one movable and extendable rod 44 and the support rods 31, so as to fasten the at least one movable and extendable rod 44 after the at least one movable and extendable rod 44 is adjusted. In order to adjust the at least one movable and extendable rod 44, the user just needs to loosen the screw members 6 relative to the fastening blocks 46 to release the screw members 6 and the fastening blocks 46 from tightly packing the at least one movable and extendable rod 44 and the support rods 31, and then the at least one movable and extendable rod 44 can be adjusted to slide along the direction of the sliding slot 311 to move close to and away from the main pipe 1, so as to make the restrain channel fit with the wheel frame width of the front wheel 101 or the rear wheel 102 of the bicycle 10 to firmly mount the bicycle 10.

Figure 7:
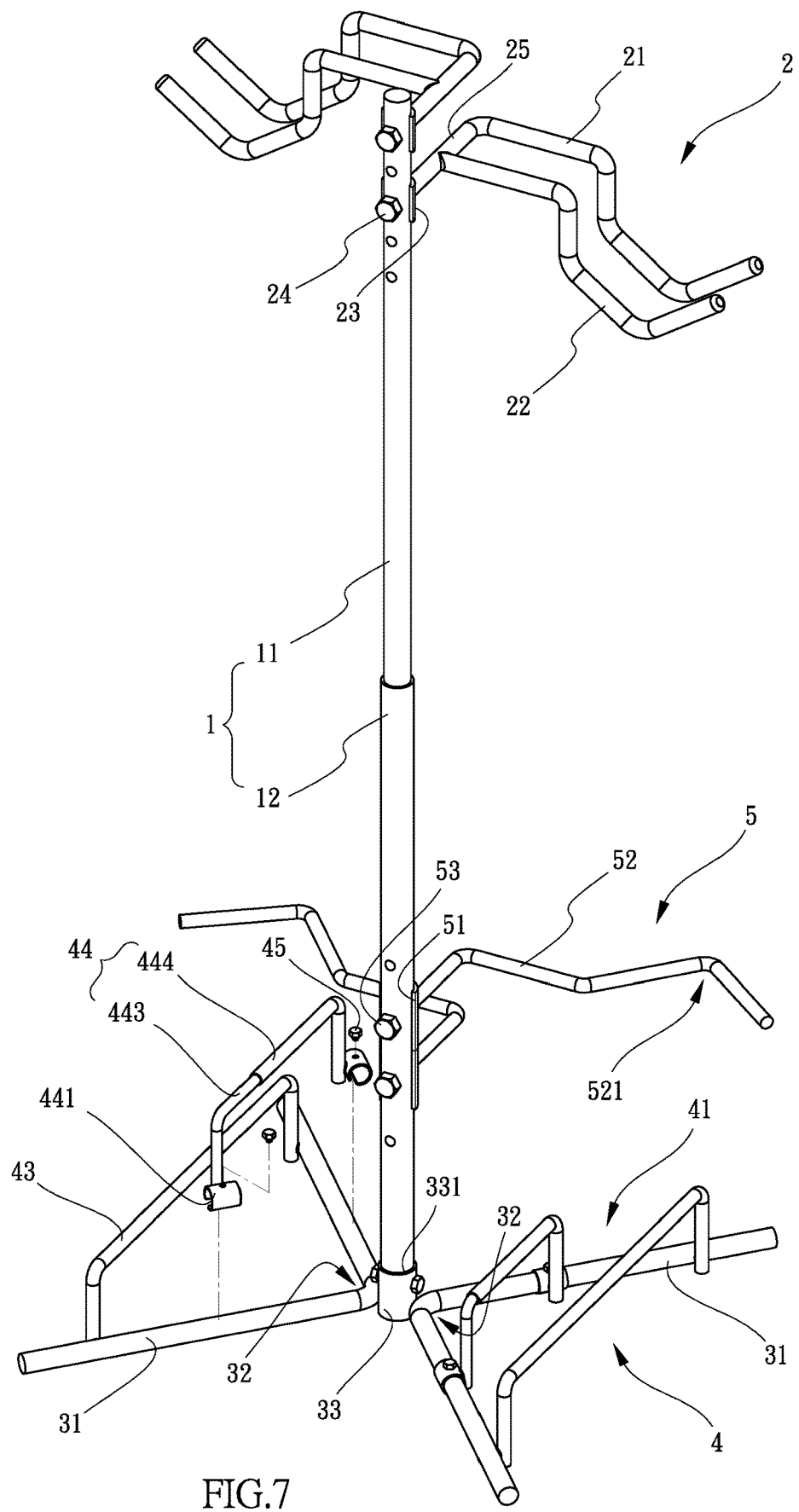
FIG. 7 is an exploded view of the second embodiment of the present invention.
Figure 8:
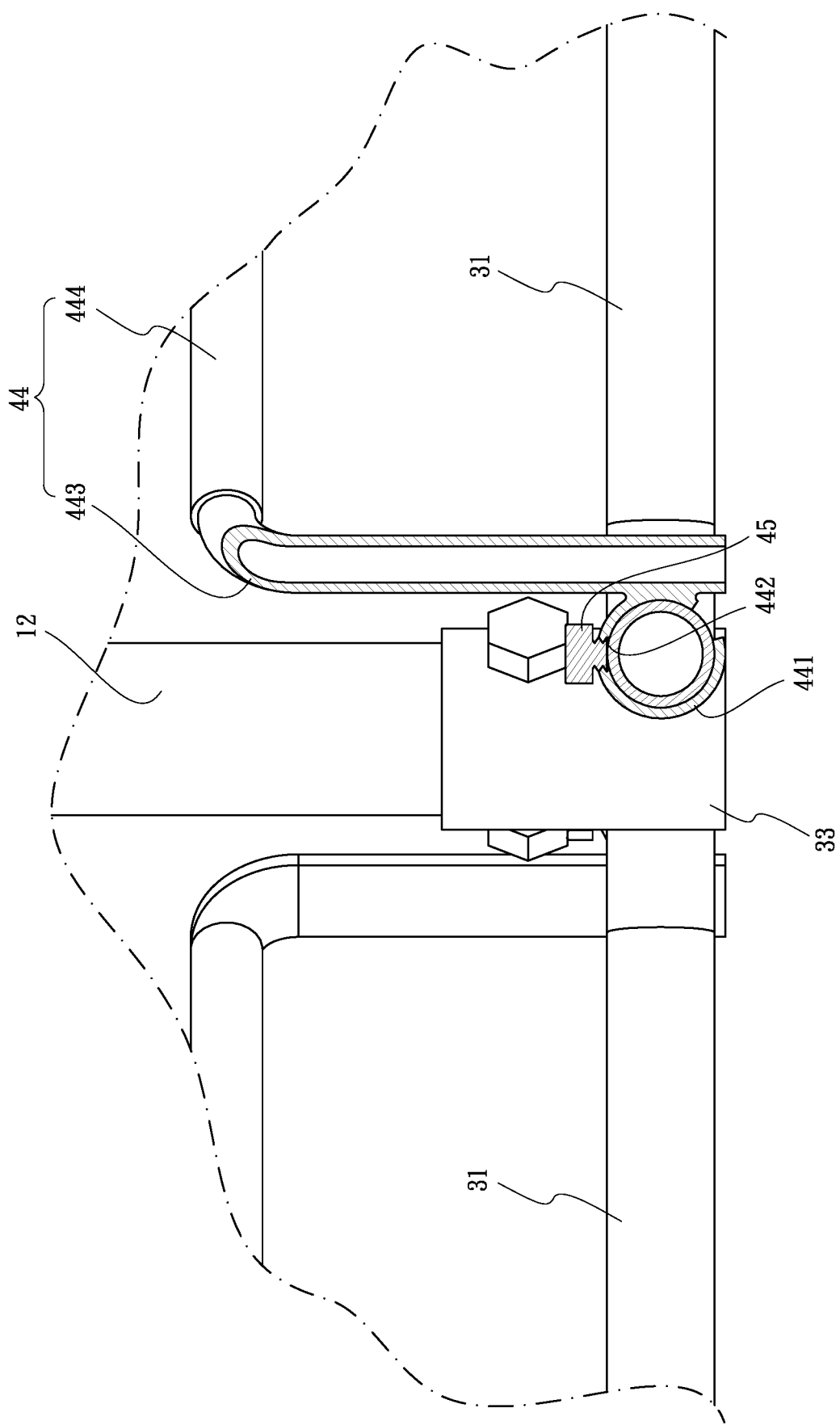
FIG. 8 is a schematic cross-sectional view taken along VIII-VIII of FIG. 6.
Figure 9:
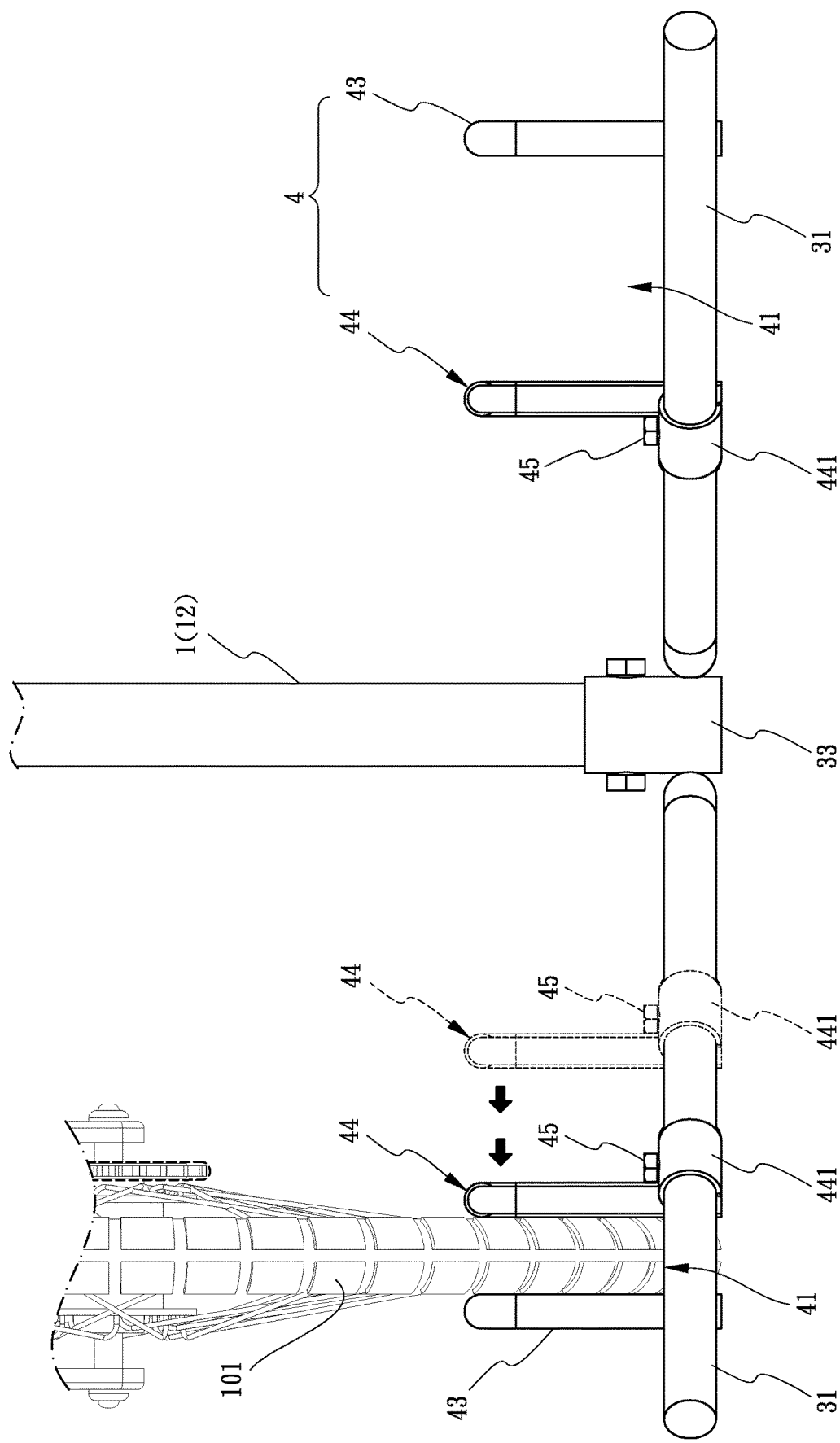
FIG. 9 is a schematic view of an operation of adjusting a movable and extendable rod of the second embodiment of the present invention.
Figure 10:
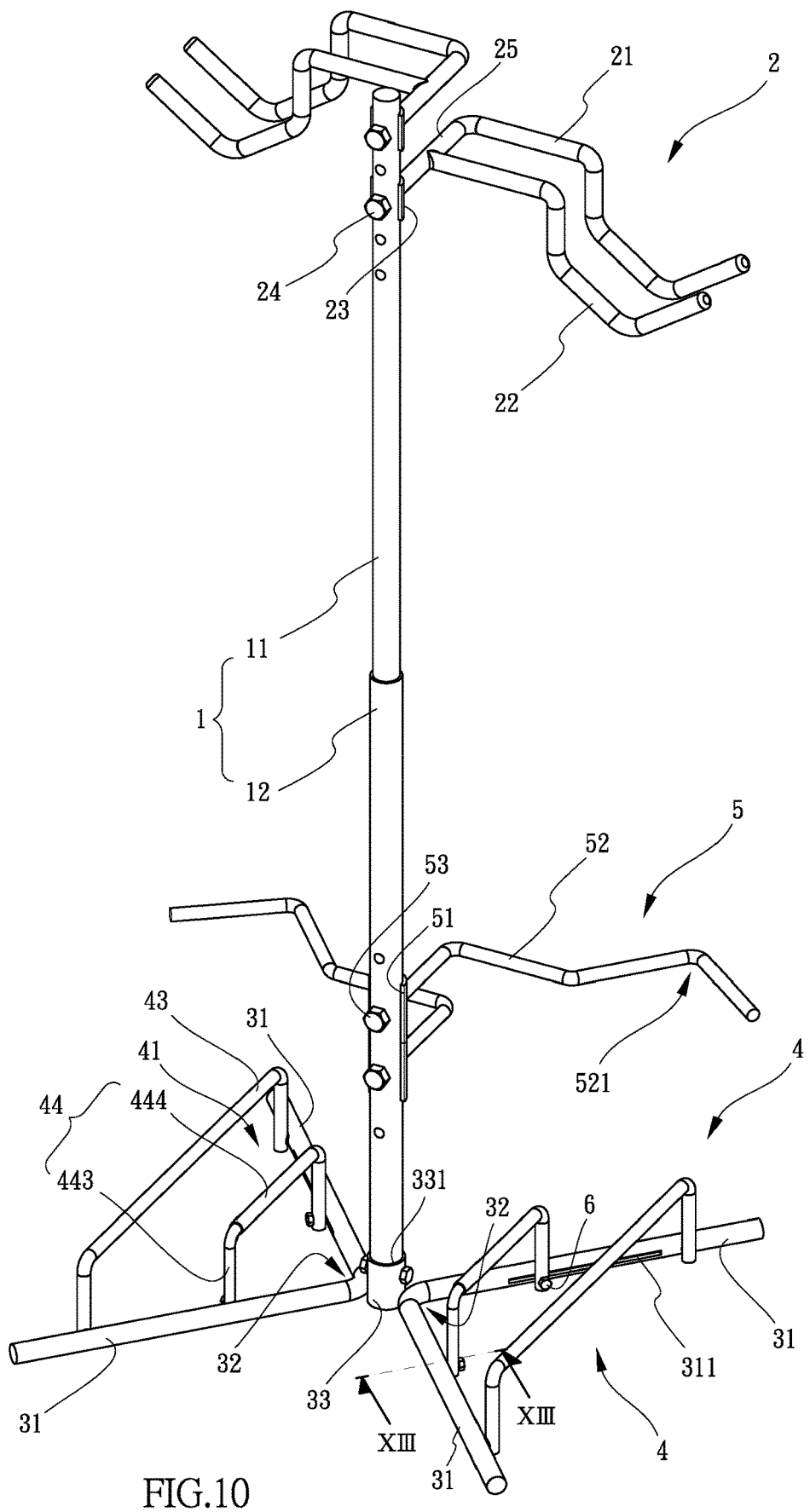
FIG. 10 is a perspective view of a third embodiment of the present invention.
Figure 11:
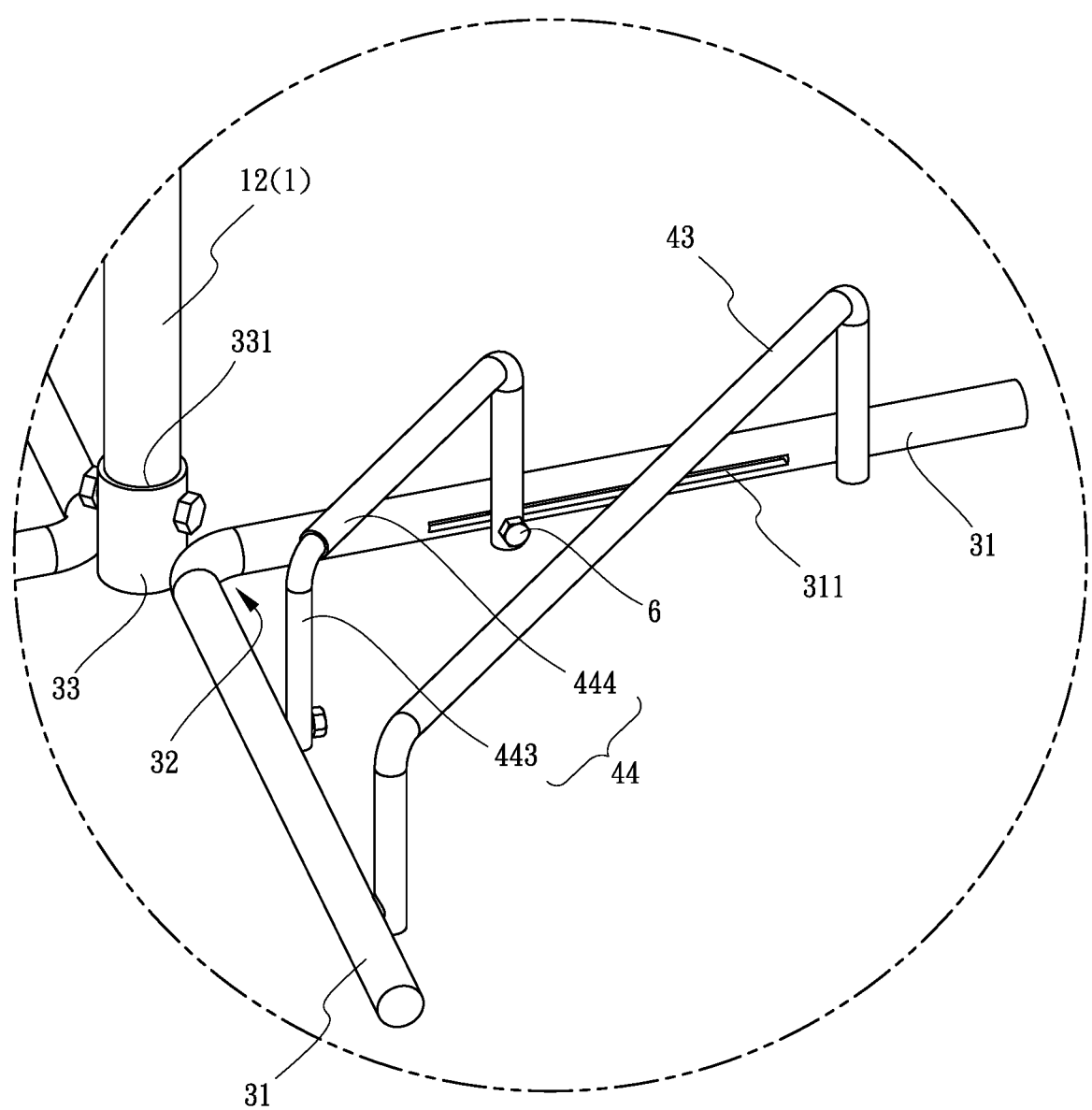
FIG. 11 is an enlarged schematic diagram of a part of the third embodiment of the present invention.
Figure 12:
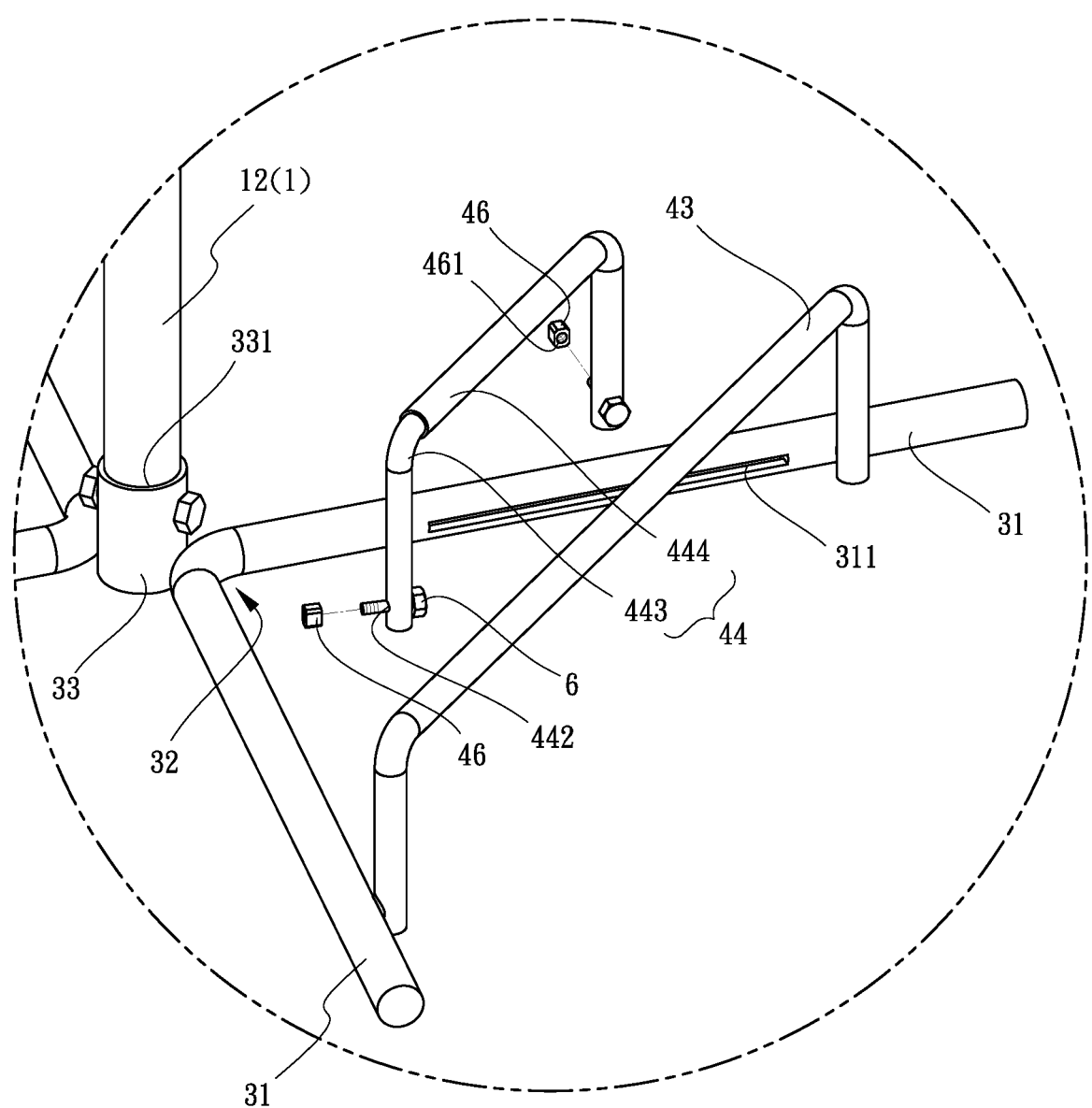
FIG. 12 is an exploded view of FIG. 11.
Figure 13:
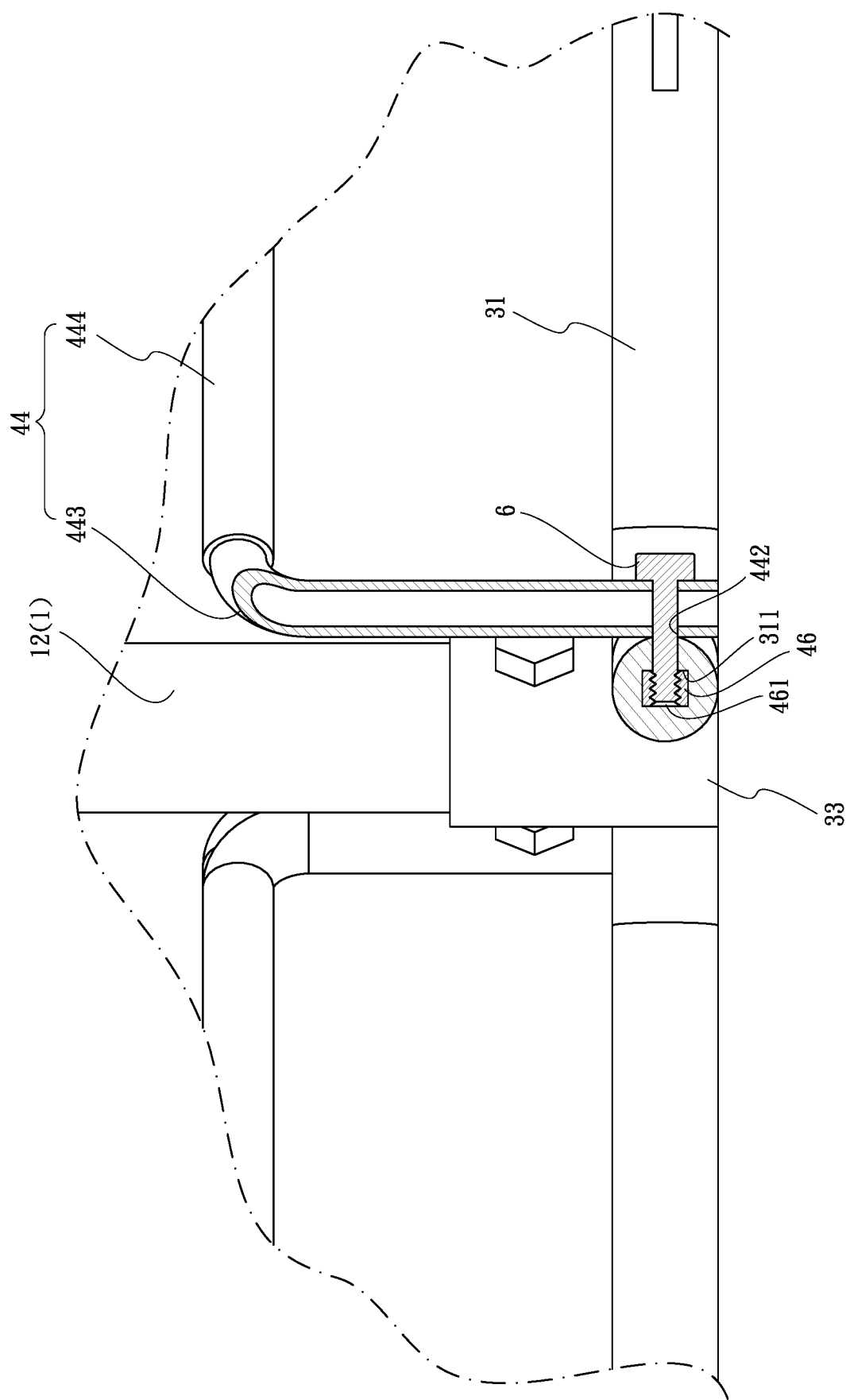
FIG. 13 is a schematic cross-sectional view taken along XIII-XIII of FIG. 10.

According to the above description, each of the at least one movable and extendable rod 44 and the main pipe 1 is implemented by a telescopic structure, for example, the at least one movable and extendable rod 44 can include a male pipe member 443 and a female pipe member 444, and each of the male pipe member 443 and the female pipe member 444 is L-shaped, an end of the male pipe member 443 is inserted into an end of the female pipe member 443, and other ends of the male pipe member 443 and the female pipe member 443 are slidably connected to the support rod 31 corresponding thereto, so that the insert connection between the male pipe member 443 and the female pipe member 443 is slidably adjustable in cooperation with movement of the at least one movable and extendable rod 44, as shown in FIGS. 7 and 9. A part of the main pipe 1 includes an upper pipe member 11 and a lower pipe member 12, the upper pipe member 11 is inserted into the lower pipe member 12, and the upper pipe member 1I is extendably adjustable relative to the lower pipe member 12; with the above-mentioned telescopic adjustment functions of the at least one movable and extendable rod 44 and the main pipe 1, the present invention can be applied to the places with different heights smoothly, and the bicycle 10 can be mounted stably and not easily shaken or swung in the standing mode or the non-standing mode, as shown in FIGS. 7, 11 and 12.

In summary, the multifunctional bicycle stand of the present invention can provide the user to exhibit and mount the bicycle 10 in places with different heights in the hanging mode or non-hanging mode; when the height of the exhibition place is sufficient, the front wheel 101 of the bicycle 10 can be hung on the hanging assembly 2 to prevent the bicycle 10 from being easily swung by external force; in the other hand, when the height of the exhibition place is not enough for hanging the bicycle 10, the user just needs to shrink the main pipe 1 to the shortest length for parking the bicycle 10. Therefore, the multifunctional bicycle stand of the present invention can provide the user with more diversified exhibition manner and mounting manner. Furthermore, the multifunctional bicycle stand of the present invention can also be used in houses or public places to park and mount the bicycle 10; for example, when parking the bicycle 10, a child who is not tall, or a woman with petite body and less strength may be unable to mount the bicycle 10 in the hanging mode; therefore, the multifunctional bicycle stand of the present invention includes the at least one positioning rod group 4 or combination of the at least one fixed rod 43 and the at least one movable and extendable rod 44 on the support stand 3, so that children and women can directly accommodate the front wheel 101 or the rear wheel 102 of the bicycle 10 in the restraining channel 41 and then adjust the at least one movable and extendable rod 44 to move close to the at least one fixed rod 43, thereby restraining the front wheel 101 or the rear wheel 102 of the bicycle 10 by a smaller space, to stably park and mount the bicycle 10.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A multifunctional bicycle stand, comprising:
    a main pipe;
    a hanging assembly mounted on a top of the main pipe and configured to hang a front wheel of a bicycle, wherein the hanging assembly comprises a hanger rod, a lateral rod, a connecting holder and a locking member, the connecting holder has an end abutted with an outer periphery of a top of the main pipe, and other end extended to form a horizontal rod, the locking member is inserted through the main pipe and locked in the connecting holder, and an end of the hanger rod and an end of the lateral rod are connected to the horizontal rod, and the hanger rod and the lateral rod are arranged in parallel with each other and in interval;
    a support stand disposed on a bottom end of the main pipe and configured to support the main pipe, wherein the support stand comprises a plurality of support rods, and the adjacent two of the plurality of support rods form an included angle area therebetween;
    at least one positioning rod group having two ends fixed on any adjacent two of the plurality of support rods, respectively and across the included angle area, and the at least one positioning rod group forms a restraining channel;
    at least one bent pipe mounted on the main pipe and disposed between the hanging assembly and the support stand; and
    wherein when the bicycle is parked on the multifunctional bicycle stand, the bicycle is hung on the hanging assembly to form a standing mode, or a front wheel or a rear wheel of the bicycle are directly accommodated in the restraining channel to park the bicycle in a non-standing mode;
    wherein the at least one bent pipe comprises a curved plate and a bow-shaped pipe, an end of the bow-shaped pipe is connected to a side of the curved plate, and a curved recessed part of the curved plate is abutted with the main pipe, and the bow-shaped pipe is continuously bent to form at least one curved part, and when the bicycle is hung on the hanging assembly by the front wheel thereof, the rear wheel of the bicycle is accommodated in the at least one curved part, and the at least one bent pipe comprises a screw inserted through the main pipe and locked with the curved plate.

2. The multifunctional bicycle stand according to claim 1, wherein the at least one positioning rod group comprises two arched pipes, two ends of each of the two arched pipes are fixed on any adjacent two of plurality of the support rods, and the two arched pipes are arranged in interval to form the restraining channel.

3. The multifunctional bicycle, stand according to claim 1, wherein the support stand comprises a mourning pipe an end of each of the plurality of support rods is connected to outer side surface of the mounting pipe, the mounting pipe has an insertion slot recessed on a top surface thereof and toward a bottom surface thereof, and an end of the main pipe is inserted into and assembled with the insertion slot.

4. The multifunctional bicycle stand according to claim 1, herein the main pipe comprises an upper pipe member and a lower pipe member, the upper pipe member is inserted into the lower pipe member, and the upper pipe member is extendably adjustable relative to the lower pipe member.

5. A multifunctional bicycle stand, comprising:
    a main pipe;
    a hanging assembly mounted on a top of the main pipe and configured to hang a front wheel of a bicycle, wherein the hanging assembly comprises a hanger rod, a lateral rod, a connecting holder, and a locking member, the connecting holder has an end abutted with an outer periphery of the top of the main pipe, and other end extended to form a horizontal rod, and the locking member is inserted through the main pipe and locked in the connecting holder, and an end of the hanger rod and an end of the lateral rod are connected to the horizontal rod, the hanger rod and the lateral rod are arranged in parallel with each other and in interval;
    a support stand disposed on a bottom end of the main pipe and configured to support the main pipe, wherein the support stand comprises a plurality of support rods, and the adjacent two of the plurality of support rods form an included angle area therebetween;

at least one fixed rod having two ends thereof respectively fixed on any, adjacent two of the support rods, and across the included angle area; and at least one movable and extendable rod slidably disposed on any adjacent two support rods, where the at least one fixed rod is disposed, of the plurality of support rods, wherein the at least one movable and extendable rod is disposed between the at least one fixed rod and the main pipe, and the at least one movable and extendable rod is slidable to move close to or away from the main pipe, and a restraining channel is formed between the at least one movable and extendable rod and the at least one fixed rod and in communication with the included angle area corresponding thereto;

wherein when the bicycle is parked on the multifunctional bicycle stand, the bicycle is hung on the hanging assembly to form a standing mode, or a front wheel of the bicycle is directly accommodated in the restraining channel to park the bicycle in a non-standing mode.

6. The multifunctional bicycle stand according to claim 5, wherein at least one movable and extendable rod comprises:

a plurality of slidable mounting plates disposed on two ends thereof, respectively, wherein each of the plurality of slidable mounting plates is in an arc shape and abutted with the support rod corresponding thereto; and a plurality of bolts corresponding in number to the plurality of slidable mounting plates, wherein the plurality of bolts are inserted into and locked with the plurality of slidable mounting plates and locked and abutted against outer surfaces of the plurality of support rods, respectively, so as to fasten the at least one movable and extendable rod after the at least one movable and extendable rod is moved;

wherein when the plurality of bolts are screwed relative to the plurality of slidable mounting plates to release the slidable mounting plates from being abutted with the outer surfaces of the plurality of support rods, the at least one movable and extendable rod is slidable to move close to or away from the main pipe.

7. The multifunctional bicycle stand according to claim 5, wherein the two support rods, which are assembled with at least one movable and extendable rod, have sliding, slots recessed on corresponding sides thereof, respectively, and two ends of the at least one movable and extendable rod are inserted through two locking holes, respectively, each of the two locking holes corresponds to one of the sliding slots of the two support rods, and fastening blocks are slidably disposed in the sliding slots, respectively, and each fastening block has a screw hole formed correspondingly in position to one of the two locking holes, and after screw members are inserted through the two locking holes and locked with the screw holes of the fastening blocks, the screw members are screwed with the fastening blocks, so that the fastening blocks and the screw members are locked with the two ends of the at least one movable and extendable rod and the corresponding support rod;

wherein after the screw members and the fastening blocks are screwed, the at least one movable and extendable rod is adjustable to move close to or away from the main pipe in position along the directions of sliding slots.

8. The multifunctional bicycle stand according to claim 5, wherein the at least one movable and extendable rod comprises an male pipe member and a female pipe member, an end of the male pipe member is inserted into an end of the female pipe member, and other ends of the male pipe member and the female pipe member are slidably connected to the support rod corresponding thereto, the male pipe member and the female pipe member are slidably adjustable in cooperation with movement of the at least one movable and extendable rod;

wherein the multifunctional bicycle stand further comprises at least one bent pipe mounted on the main pipe disposed between the hanging assembly and the support stand, the at least one bent pipe comprises a curved plate and a bow-shaped pipe, an end of the bow-shaped pipe is connected to a side of the curved plate, and a curved recessed part of the curved plate is abutted with the main pipe, and the bow-shaped pipe is continuously bent to form at least one curved part, when the bicycle is hung on die hanging assembly by the front wheel thereof, a rear wheel of the bicycle is accommodated in the at least one curved part, and a screw is inserted through the main pipe and locked with the curved plate.

9. The multifunctional bicycle stand according to claim 5, wherein the support stand comprises a mounting pipe, an end of each of the plurality of support rods is connected to an outer side surface of the mounting pipe, the mounting pipe has an insertion slot recessed on a top surface thereof and toward bottom surface thereof, an end of the main pipe is inserted into and assembled with the insertion slot;

wherein the main pipe comprises an upper pipe member and a lower pipe member, the upper pipe member is inserted into the lower pipe member, and the upper pipe member is extendably adjustable relative to the lower pipe member.

* * * * *